Figure 1:
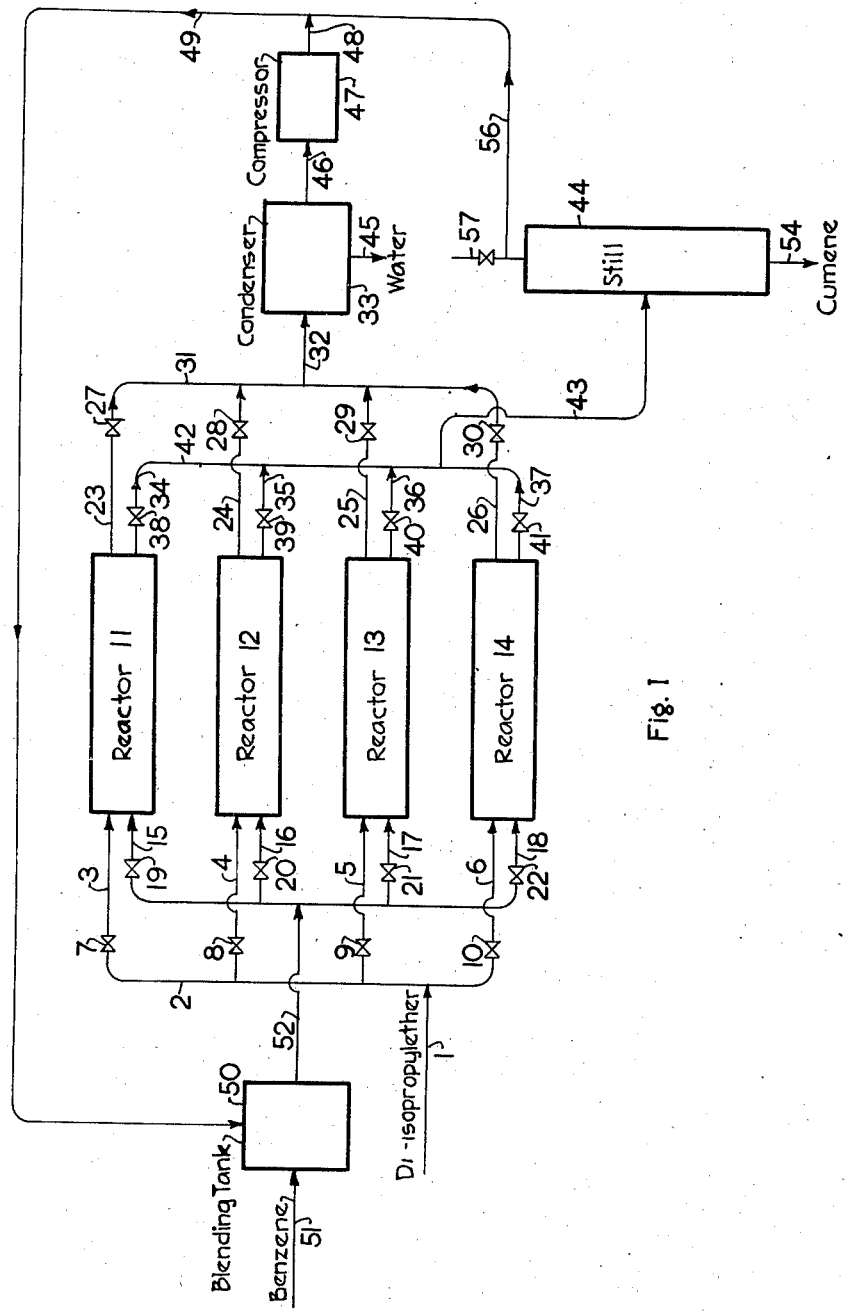

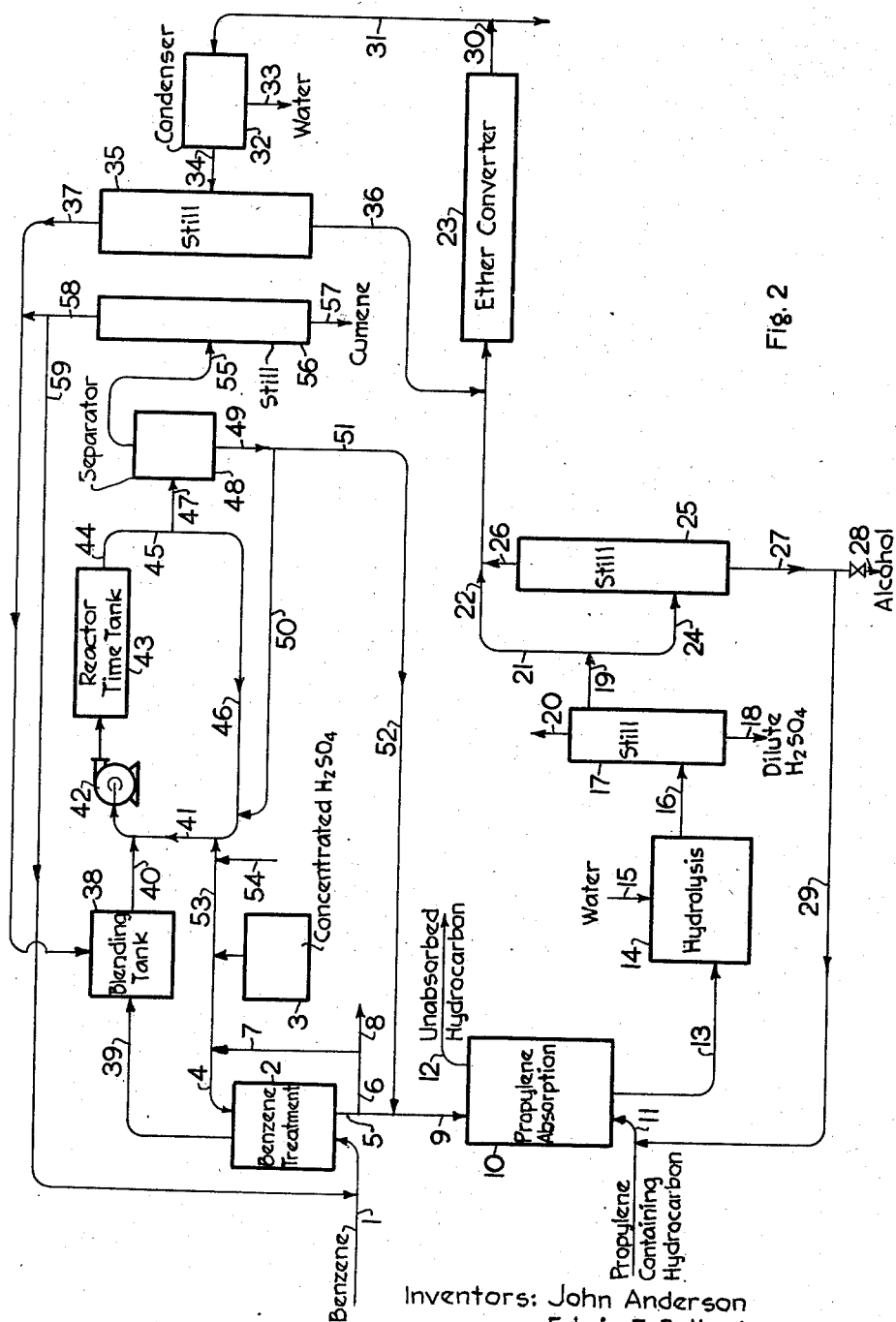

Patented May 8, 1945

2,375,724

UNITED STATES PATENT OFFICE 2,375,724

PRODUCTION OF ALKYLATION PRODUCTS

John Anderson, Berkeley, and Edwin F. Bullard, Oakland, Calif., assignors to Shell Development Company, San Francisco, Calif., a corporation of Delaware Application January 19, 1943, Serial No. 472,906

8 Claims. (Cl. 260—671)

This invention relates to the reaction of alkylatable organic compounds with alkylating agents in the presence of alkylation catalysts. It deals, more particularly, with a new method of carrying out such reactions using ethers as the source of the alkyl group to be introduced into the alkylatable compounds. The invention is especially concerned with an improved reaction procedure whereby the cost of such alkylations may be reduced and the consumption of catalyst in the process may be lowered.

It is known that a wide variety of both aromatic and aliphatic compounds may be alkylated by reaction with an ether in the presence of suitable catalysts. Reactions of this type have not been widely used, however, in spite of the ready availability of suitable ethers, because of the high cost of catalyst involved in prior methods of carrying out alkylations with ethers. This high cost of catalyst has been due to the fact that in alkylating with ethers water is formed and this water adversely affects the alkylation catalyst making it necessary to replace or reactivate the catalyst at frequent intervals. As a result, it has not been economically feasible to take advantage, for alkylation, of the substantial amounts of low priced by-product ethers produced by the alcohol industry. An important object of the present invention is to provide a method of operation whereby such ethers, or those from other sources, can be profitably employed in the production of alkylation products. Another object is to provide an improved method of converting ethers to olefins which may then be reacted with an alkylatable compound or employed in other suitable ways. Still another object is to improve the production of alkylation products from olefinic starting materials by converting the olefins to ethers prior to the alkylation step of the process. Further objects and advantages of the process will be apparent from the following description of the invention.

For the purpose of making the invention more clear, it will be described with more particular reference to the treatment of aromatic hydrocarbons to produce mono-alkylated and/or poly-alkylated aromatic hydrocarbons using as the alkylation catalyst a solid phosphoric acid catalyst prepared as described in U. S. Patent 1,993,513. It will be understood, however, that this application of the invention is illustrative only and that other alkylatable compounds may be treated in the presence of the same or other alkylation catalysts which are analogously affected by water as will be hereinafter more fully pointed out.

In carrying out alkylations with solid phosphoric acid catalysts it has been found to be highly desirable to have some water vapor present during the reaction in order to maintain the catalyst at maximum activity. However, when alkylating with ethers the water formed in the reaction has been found to be in such excess as to be detrimental. It causes the catalyst to soften so that with continued use it plugs up the reactor and reduces or stops the flow of reactants. As a result, the useful life of the catalyst is materially reduced. Furthermore, corrosion of the apparatus takes place due to the accumulation of aqueous phosphoric acid solution. These difficulties are avoided according to the invention by first converting the ether to the corresponding olefin or olefins and employing the latter in the alkylation step of the process. For the conversion of the ether to the olefin the same solid phosphoric acid catalyst used for alkylation may be employed. The undesirable effects of the water liberated from the ether are not encountered in this procedure because the decomposition of the ether may be carried out at pressures at which the water produced is maintained as vapor throughout the reaction and is separated from the olefin before the use of the latter for alkylation under the higher pressures which are necessary for successful operation of this step of the process. Thus, for example, the ether decomposition may be effected at pressures below about 50 pounds per square inch, ordinary atmospheric pressure being most conveniently used, while for alkylation with ethers pressures of 250 pounds or more are desirable as is also the case when alkylating with the olefins obtained from the ethers according to the invention.

The temperature and rate of ether feed to be used in any given case will depend upon the particular ether or ethers involved and the activity of the catalyst employed. With di-isopropyl ether and a solid phosphoric acid catalyst of high activity, for example, substantially complete conversion of the ether to propylene has been obtained at temperatures as low as 200° C. with ether feed rates of 2000 grams per liter of catalyst space per hour when carrying out the reaction at atmospheric pressure. With the same catalyst a 93% yield of propylene was obtained with a di-isopropyl ether feed rate of 2400 grams per hour per liter of catalyst space when using a temperature of 300° C. Other secondary ethers such as isopropyl-secondary butyl ether, di-secondary butyl ether and the like may be treated under the same conditions while somewhat lower temperatures and/or higher throughput rates are butyl ether and the like which yield olefins which tend to polymerize more readily. Mixed secondary-tertiary ethers such as isopropyl-tertiary butyl ether, secondary butyl-tertiary butyl ether, etc., also may be used, as well as ethers containing primary alkyl groups, for example, di-ethyl ether, ethyl- or methyl-normal propyl ethers and the like which, however, require somewhat more drastic conditions, i. e. higher temperatures and/or lower feed rates, than the secondary or tertiary ethers.

One advantageous method of carrying out the process of the invention is to employ a cyclic system of operation which takes advantage of the ether decomposition reaction for reactivating the alkylation catalyst. This method of operation, as applied to the production of cumene, is illustrated diagrammatically in Figure I of the attached drawings, which is a flow of diagram in which only the principal pieces of apparatus involved when using four catalytic reactors are indicated. The location of the auxiliary equipment necessary for operation according to this modification of the process of the invention will be obvious to those skilled in the art. In Figure I of the drawings, 1 indicates a supply line for di-isopropyl ether which feeds to a manifold 2 from which branch lines 3, 4, 5 and 6 controlled by valves 7, 8, 9 and 10 lead to reactors 11, 12, 13 and 14. These reactors may be horizontal or inclined tubes or vertical towers packed with heating means, not shown. The reactors are each equipped with a second feed line 15, 16, 17 and 18 controlled respectively by valves 19, 20, 21 and 22. Reactor outlet lines 23, 24, 25 and 26 provided with valves 27, 28, 29 and 30 feed to line 31 which is connected by line 32 to condenser 33, while outlet lines 34, 35, 36 and 37 controlled by valves 38, 39, 40 and 41 lead to manifold 42 which is connected by line 43 to fractionating column 44. In starting up operations, one of the reactors, for example 11, will be used for converting the ether to propylene, while the other reactors are employed for alkylation. Valves 7, 20, 21, 22, 27, 39, 40 and 41 will therefore be opened and valves 8, 9, 10, 19, 28, 29, 30 and 38 will be closed. The ether flowing by lines 1, 2 and 3 to reactor 11 is preferably in the vapor phase and, as previously pointed out, is reacted at about atmospheric pressure. The reaction products flow by lines 23, 31 and 32 to condenser 33 which is provided with cooling means not shown. The water and higher boiling components, particularly impurities removed from the catalyst when the ether conversion operation is used to assist catalyst regeneration as described hereinafter, thus removed are withdrawn by line 45 and the propylene, which may contain some unconverted ether, is conducted by line 46 to compressor 47 in which it is raised to sufficient pressure to permit alkylation therewith at about 250-300 pounds per square inch. The compressed propylene is passed by lines 48 and 49 to blending tank 50 in which it is mixed with benzene introduced by line 51. The resulting mixture, preferably containing at least 3 mols of benzene per mol of propylene, is passed by line 52 to manifold 53 feeding reactors 12, 13 and 14 by lines 16, 17 and 18. These reactors are advantageously maintained at a temperature of about 200° C.–300° C., and a space velocity of hydrocarbon of about 0.1 to 0.6 gallon per hour per pound of catalyst is preferably used. The reacted alkylation mixture is passed by lines 35, 36 and 37 to lines 42 and 43 feeding still 44 in which the cumene produced is removed as bottom product by line 54 while the excess unreacted benzene together with any remaining propylene is removed overhead by line 55 and returned to the reaction by lines 56 and 49. Where the feed materials contain diluents which tend to accumulate in the recycle stream, these may be removed by vent line 57. After operating in this manner for a period which will vary with the reactants involved and the operating conditions used, the catalyst tends to decrease in activity due mainly to the fact that its surface becomes coated with higher boiling products of side reactions. When this occurs, the catalyst may be reactivated by suitable air blowing and steaming treatments, preferably first steaming at about 260° C. to 275° C. to remove volatile materials, then air blowing at above 500° C. to oxidize remaining impurities and finally resteaming to restore the desired moisture content of the catalyst, for which purpose steaming for about 4 hours at about 260° C. is usually sufficient. The frequency with which such regeneration cycles need be carried out may be reduced by taking advantage of the steaming effect which occurs during operation of reactors for ether conversion. Thus, after a suitable period of operation with reactor 11 as the ether converter, valves 7, 20, 27 and 39 may be closed and valves 8, 19, 28 and 38 may be opened to allow the ether conversion to take place in reactor 12 while reactor 11 is used for alkylation. Later, reactors 13 and 14 may be successively employed as ether converters, the low pressure operation with large amounts of water from the ether reaction having a regenerating effect upon the alkylation activity of the catalyst so that an overall longer effective life of the solid phosphoric acid may be realized. Also, ether conversion may be substituted for one or both of the steaming operations used with air blowing of the catalyst. Instead of employing a single reactor for the ether conversion, it may be desirable to use two reactors which may be connected either in parallel or in series. It will also be seen that it is not necessary to have four reactors in order to carry out the process since by intermittent operation and storage of the intermediate products, one reactor may be made to perform all the necessary functions.

While the process of the invention is of especial advantage when using the same catalyst, particularly a solid phosphoric acid catalyst, for the ether conversion and alkylation steps, it is also highly useful when a different catalyst such, for example, as sulfuric acid is employed for catalyzing the alkylation. In fact, this procedure offers special economies since the same acid may be used in more than one operation of the process. Figure II of the drawings is a flow diagram showing one method of carrying out this procedure as applied to the production of cumene from benzene and propylene-containing hydrocarbon, such as a propane-propylene fraction of petroleum cracking products, for example. In this arrangement of apparatus, 1 indicates a supply line for feeding the benzene to be alkylated to a treating vessel 2 in which it is contacted with concentrated sulfuric acid supplied from a source 3 by line 4. This treatment is preferably carried out with sulfuric acid of about 90% to 100% concentration at about 10° C. to 60° C. using a ratio of acid to benzene of about 0.16:1 to about 0.25:1 and maintaining the acid and benzene in intimate contact for at least three minutes and more preferably 4 to 6 minutes or longer. This pretreatment of the aromatic hydrocarbon being alkylated materially improves the quality of the alkylation product as well as increases the effective life of the alkylation catalysts when using the ordinary commercially available impure aromatic hydrocarbons as more fully described and claimed in copending applications, Serial Nos. 464,286 and 464,287, filed November 2, 1942. The treating acid is withdrawn by line 5 and a part may be advantageously recycled by lines 6, 7 and 4 while the remainder is removed by line 8 for regeneration or other use; or more preferably is used for the preparation of the ether employed in the process, as in this way not only may the acid requirements of the system be reduced but also any olefins present in the treated benzene may be efficiently and cheaply recovered, as will be more fully described hereinafter. To this end, the acid from the benzene treating unit may be conducted by line 9 to an ether production unit, for example a propylene absorber 10 to which propylene-containing hydrocarbon is fed by line 11. The unabsorbed hydrocarbon is removed by line 12 and the sulfuric acid containing the absorbed propylene is withdrawn by line 13 to hydrolyzer 14 in which it is converted, at least in part, to di-isopropyl ether; water for the hydrolysis being admitted by line 15. The hydrolysis product is conducted by line 16 to a still 17 in which the reaction products are flashed off from the dilute sulfuric acid which is withdrawn by line 18, while the ether is removed by line 19 and any lower boiling components are taken off by line 20. The olefin absorption may be carried out as described, for example, in United States Patents Nos. 1,955,873, 1,967,410 or 2,106,521, while the hydrolysis is preferably conducted according to the method of United States Patent 2,076,213. Alternatively, the ether may be produced by the process of United States Patent 2,178,186 or may be formed by reacting the olefin with an alcohol as described, for example, in United States Patent 2,067,385. The ether produced may be conducted by lines 21 and 22 to reactor 23 directly; or where it is desirable to first separate alcohol or other components therefrom, it may be fed by line 24 to still 25, the ether then being fed to reactor 23 by lines 26 and 22 while the alcohol is removed by line 27 and either withdrawn from the system by line 28 or returned to the ether producing unit by lines 29 and 11. It will be understood that, depending upon the relative volatilities of the components of the mixture being fed to column 25, it may be desirable to withdraw the described and/or other streams at other points and that the indicated separation is intended to be illustrative of one possible method of operation only.

In reactor 23 the ether, with or without alcohol or other compounds which do not interfere with the reaction, is contacted with a solid phosphoric acid catalyst, as previously described, to produce the corresponding olefin or olefins which are conveyed by lines 30 and 31 to a condenser 32 or other suitable means for removing the water liberated in the reaction. The water is withdrawn by line 33 and may be used in the previously described hydrolysis by connecting lines 33 and 15 by a line not shown. The olefin produced is preferably led by line 34 to still 35 in which any unreacted ether and/or alcohol, etc. is separated by line 36 and returned to reactor 23 by line 22. The separated propylene is conducted by line 37 to blending tank 38 where it is mixed with the benzene from treater 2 supplied by means of line 39. The resulting mixture of benzene and propylene, preferably in a molal ratio of at least 3 to 1, is fed by line 40 into a circulating stream of emulsified reaction mixture flowing in the closed circuit formed by line 41, pump 42, time tank 43, and lines 44, 45 and 46. Reacted mixture is continuously withdrawn from the circuit by line 47 to separator 48 in which the emulsion is allowed to stratify, separated sulfuric acid being removed by line 49 and returned in part to the alkylation by line 50 while the remainder is fed by lines 51, 52 and 9 to the ether producing unit. Sufficient acid to make up for that removed from the alkylation system is added from the supply tank 3 by line 53. The concentration of the added acid, which may be regulated by the introduction of water by line 54, and rate of acid removal and replacement, are preferably adjusted so as to maintain the concentration of sulfuric acid in the acid phase of the circulating emulsion between about 80% and 90%. Preferably, the acid and hydrocarbon phases of the emulsion are maintained about equal in volume and the hydrocarbon feed rate is adjusted so as to insure an average time of contact of at least 10 minutes. The reaction temperature is controlled by means not shown so as to keep the circulating emulsion between about 40° C. and 50° C.

The hydrocarbon phase separated from the reacted emulsion, containing the alkylation product, excess benzene and any other unreacted components, is withdrawn from separator 48 and, preferably after reaction in a unit not shown with a base, for example 10% to 50% by volume of 2% to 10% aqueous sodium hydroxide solution at between 100° C. and 180° C. for at least 5 minutes (as described in copending application Serial No. 464,287), is conducted by line 55 to still 56. The cumene produced is recovered by line 57 and the unreacted benzene is taken off overhead by line 58 and returned to the alkylation by line 37. Most preferably, a part of the unreacted benzene is diverted as by line 59 for retreatment with sulfuric acid before being again used for alkylation.

The advantages of employing the foregoing combination of steps are not confined to alkylations in the presence of sulfuric acid but may also be used with the arrangement illustrated in Figure I of the drawings, in which a solid phosphoric acid alkylation catalyst is employed. In the latter case, it provides an economical means for recovering any unreacted olefin in the alkylation product. Such olefin will be present with the excess benzene removed by line 56 when using the system of Figure I and, unless separated by another fractionation step, will be absorbed in the treating acid and lost when the recycle benzene is retreated before being returned to the reaction as is desirable, as previously pointed out. However, by the present method of operation in which the benzene treating acid is used for ether production, such olefin is retained in the system and efficiently re-used. The system has the further advantage, regardless of the type of alkylation catalyst used, of cheaply and efficiently eliminating the diluents and undesirable components of olefinic feed stocks which are withdrawn by line 12 instead of being fed to the alkylation unit, reducing its capacity and undesirably shortening the life of the catalyst, as in the usual procedures of direct alkylation with olefins.

It will be seen that the process of the invention offers many advantages, particularly in regard to increased yields of alkylation products and with and apparatus, compared with prior methods of alkylation employing either ether or olefins as alkylating agents. These advantages may be obtained not only when alkylating aromatic compounds but also for the alkylation of aliphatic compounds, particularly aliphatic compounds having a tertiary carbon atom. Thus—in addition to benzene—toluene, naphthalene, methyl naphthalene, phenols, chlorbenzene, isobutane, isopentane and homologues may be similarly treated. As already indicated, the process is not limited to operations involving di-isopropyl ether and, furthermore, other alkylation and ether converting catalysts may also be employed. For example, Friedel-Crafts type alkylation catalysts such as aluminum chloride, either in solid form or as complexes which may be liquid under the operation conditions or hydrogen fluoride or boron fluoride, etc., may be used in the alkylation step while other methods of converting the ether to olefin may be employed instead of the preferred new procedure of reacting in the presence of a solid phosphoric acid catalyst. Thus, acid phosphoric acid salts or solutions of phosphoric or sulfuric acid may be used. However, as previously pointed out, conversion of ether in the presence of a solid phosphoric acid catalyst as described offers special advantages and it is a feature of the invention that this new procedure may be used wherever olefins are to be produced from ethers, regardless of the source of the ether or the intended use of the olefin produced therefrom. Still other modifications of the process may be made without departing from the invention which is not limited to the conditions or details of operation used to illustrate the principles involved nor by any theory advanced in explanation of the improved results obtained.

We claim as our invention:

1. A process of producing cumene which comprises contacting di-isopropyl ether at substantially atmospheric pressure with a solid phosphoric acid catalyst at about 150° C. to 400° C. for a time at which substantial conversion of said ether to propylene and water is effected, separating water from the reaction products and reacting a substantial molar excess of benzene with the propylene under a pressure of between 250 and 600 pounds per square inch in the presence of a solid phosphoric acid catalyst at about 200° C. to 300° C. whereby alkylation of benzene with proylene takes place, continuing said alkylation until the alkylation catalyst has suffered an appreciable loss in alkylation activity, and then contacting said partly spent alkylation catalyst with di-isopropyl ether under said propylene forming conditions.

2. In a process of producing cumene from benzene and propane-propylene containing hydrocarbons wherein a substantial stoichiometric excess of sulfuric acid-treated benzene is reacted with propylene at a pressure of at least 250 pounds per square inch in the presence of a solid phosphoric acid catalyst under alkylating conditions, the improvement which comprises reacting said propane-propylene containing hydrocarbon with sulfuric acid from said benzene treatment under conditions at which di-isopropyl ether is produced, contacting said ether with solid phosphoric acid from said alkylation reaction at a substantially lower pressure and a temperature at which propylene and water are formed therefrom, removing water from said propylene, and feeding the propylene to said alkylation reaction.

3. In a process of producing cumene by reacting a stoichiometric excess of benzene with propylene in the vapor phase in the presence of a solid phosphoric acid catalyst under conditions at which alkylation of the benzene takes place without complete conversion of the propylene, the improvement which comprises contacting propylene-containing benzene from said alkylation with about 0.16 to 0.25 volumes of aqueous sulfuric acid of at least 90% concentration per volume of hydrocarbon at a temperature of 10° C. to 60° C. for a time at least 3 minutes, at which absorption of propylene in said acid takes place and undesirable components of the benzene are removed, reacting the resulting propylene-containing acid with water under conditions at which di-isopropyl ether is produced, contacting said ether with solid phosphoric acid from said alkylation reaction at a substantially lower pressure and a temperature at which propylene and water are formed therefrom, removing water from said propylene, and feeding the propylene to said alkylation reaction.

4. In a process of producing cumene from benzene and di-isopropyl ether, the improvement which comprises contacting di-isopropyl ether at substantially atmospheric pressure with a solid phosphoric acid catalyst at about 150° C. to 400° C. for a time at which substantial conversion of said ether to propylene and water is effected, separating water from the reaction products and reacting a substantial molar excess of benzene with the propylene produced in the presence of the partly spent solid phosphoric acid catalyst used in said ether reaction.

5. A process of alkylating an alkylatable compound which comprises reacting an ether having an alkyl group of at least two carbon atoms at a pressure below 50 pounds per square inch in the presence of a solid phosphoric acid catalyst under conditions at which an olefin is formed therefrom and reacting said olefin with said alkylatable compound at a substantial higher pressure in the presence of the partly spent solid phosphoric acid alkylation catalyst used in said ether reaction, and under alkylating conditions.

6. A process of producing an alkylated aromatic hydrocarbon which comprises contacting an ether having an alkyl group of at least two carbon atoms with a solid phosphoric acid catalyst under conditions at which an olefin is produced therefrom, and reacting said olefin with an alkylatable aromatic hydrocarbon in the presence of solid phosphoric acid catalyst which has become at least partly spent from said ether treatment.

7. A process of producing an alkylation product of an isoparaffin which comprises contacting an ether having an alkyl group of at least two carbon atoms with a solid phosphoric acid catalyst under conditions at which an olefin is produced therefrom, and reacting said olefin with an isoparaffin in the presence of solid phosphoric acid catalyst which has become at least partly spent from said ether treatment.

8. A process of producing an alkylation product which comprises contacting an ether having an alkyl group of at least two carbon atoms with a solid phosphoric acid catalyst under conditions at which an olefin is produced, and reacting said olefin with an alkylatable compound in the presence of solid phosphoric acid catalyst which has become at least partly spent from said ether treatment.

JOHN ANDERSON.
EDWIN F. BULLARD.